No. 776,456. PATENTED NOV. 29, 1904.
R. & T. B. CHRISTIE.
PNEUMATIC STRAW STACKER FOR THRESHING MACHINES.
APPLICATION FILED MAY 2, 1903.
NO MODEL. 3 SHEETS—SHEET 1.

Witnesses.

Inventors
Robert Christie and Thomas Barcroft Christie
By John H. Hendry, Atty.

No. 776,456. PATENTED NOV. 29, 1904.
R. & T. B. CHRISTIE.
PNEUMATIC STRAW STACKER FOR THRESHING MACHINES.
APPLICATION FILED MAY 2, 1903.
NO MODEL. 3 SHEETS—SHEET 2.

Witnesses.

Inventors.
Robert Christie and Thomas Barcroft Christie
By John K. Hendry, Atty.

No. 776,456. PATENTED NOV. 29, 1904.
R. & T. B. CHRISTIE.
PNEUMATIC STRAW STACKER FOR THRESHING MACHINES.
APPLICATION FILED MAY 2, 1903.
NO MODEL. 3 SHEETS—SHEET 3.
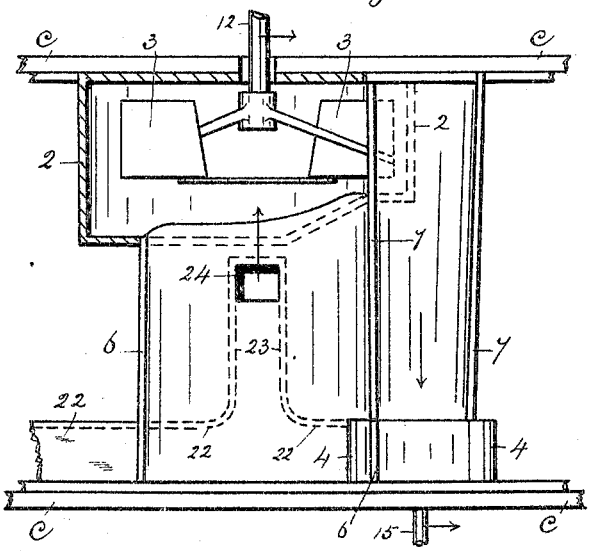
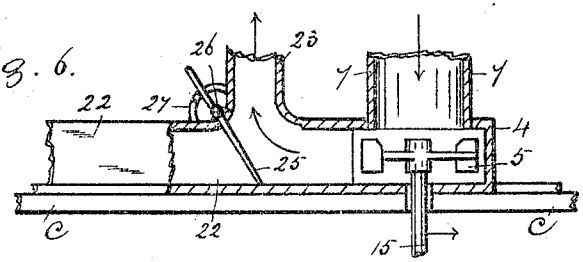
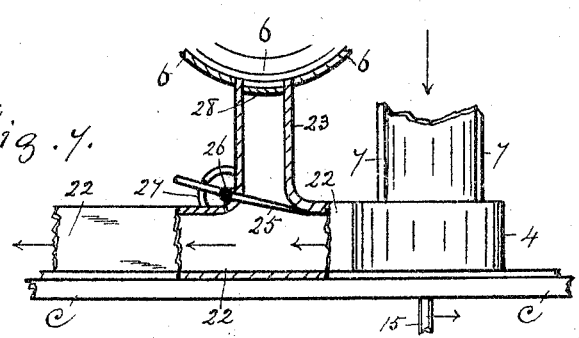

No. 776,456. Patented November 29, 1904.

UNITED STATES PATENT OFFICE.

ROBERT CHRISTIE AND THOMAS BARCROFT CHRISTIE, OF HAMILTON, CANADA.

PNEUMATIC STRAW-STACKER FOR THRESHING-MACHINES.

SPECIFICATION forming part of Letters Patent No. 776,456, dated November 29, 1904.

Application filed May 2, 1903. Serial No. 155,281. (No model.)

*To all whom it may concern:*

Be it known that we, ROBERT CHRISTIE and THOMAS BARCROFT CHRISTIE, citizens of Canada, residing at Hamilton, in the county of Wentworth and Province of Ontario, Canada, have invented certain new and useful Improvements in Pneumatic Straw-Stackers for Threshing-Machines, of which the following is a specification.

Our invention relates to improvements in a pneumatic straw-stacker for threshing-machines and consists of straw-fan and chaff-fan casings, or housings, having suitable revolving fans and specially adapted material-inclines or feed-hoppers connected to the lower inner parts of said casings, together with suitable straw and chaff discharge pipes connected to said casings, all conveniently arranged and located at opposite sides of the machine and within the framework of the machine.

The objects of our invention are, first, to provide a pneumatic straw-stacker and a cooperative chaff-conveyer at opposite sides of the machine with suitable inclined material hoppers communicating with the lower inner parts of the casings, all conveniently arranged and located within the framework or sides of the machine; second, to provide means for conveying the chaff from the chaff-fan to the inclined straw-fan hopper to communicate with the straw-fan by means of the pneumatic suction of the straw-fan upon the chaff, and, third, to provide means for separating the chaff from the straw and discharging the straw and the chaff through separate pipes to different places. We attain these objects by the mechanism illustrated in the accompanying drawings, in which—

Figure 1:
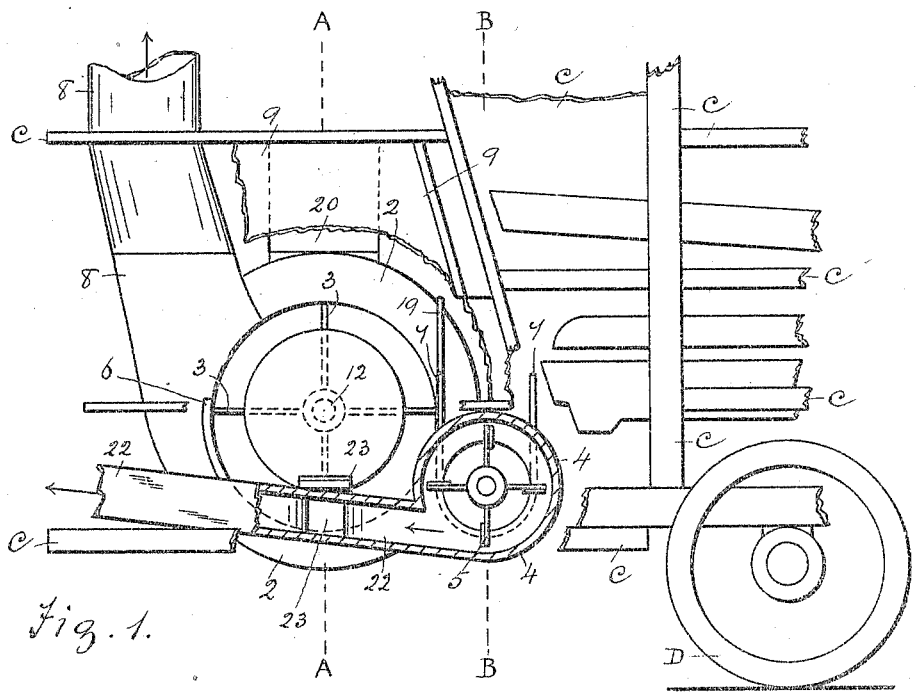
Figure 2:
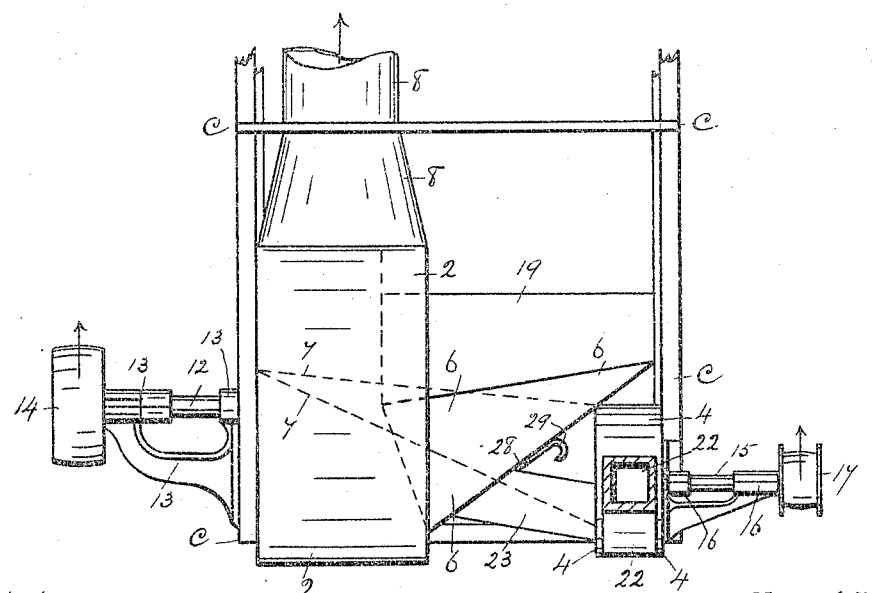
Figure 3:
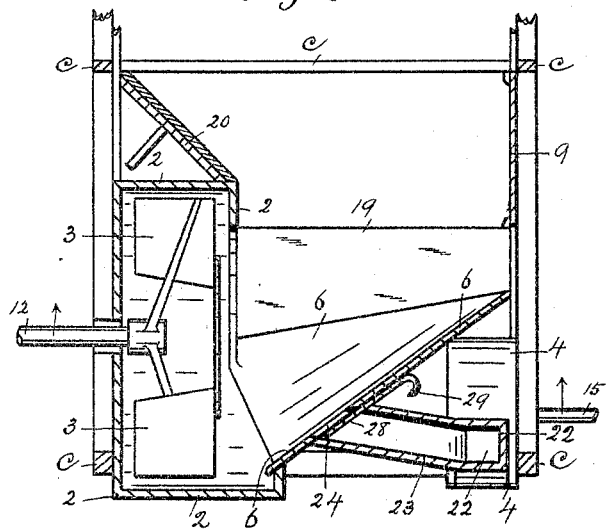
Figure 4:
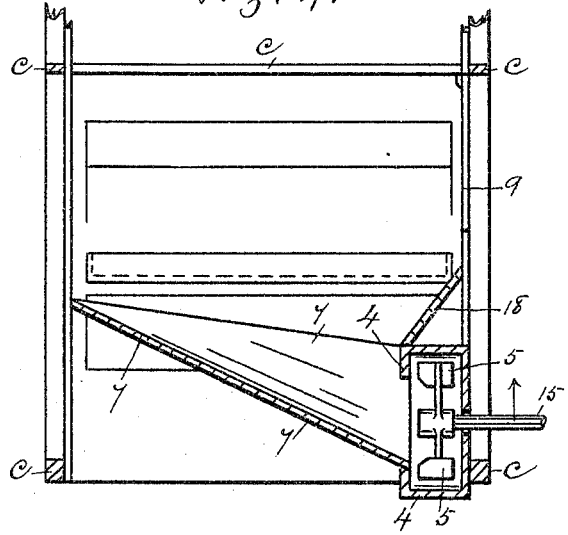

Figure 1 is an elevation of the rear part of a threshing-machine broken and part of the framework side and the straw-fan hopper broken away to show the straw-fan casing and the chaff-fan casing, the latter, together with its discharge-pipe, being in section, also the opening in said discharge-pipe, which allows the chaff through its branch pipe to communicate with the inclined hopper of the straw-fan. Fig. 2 is an end elevation of the machine as viewed from the rear of the machine, showing the straw and chaff fan casings at the opposite sides of the machine and within the sides of the machine, the inclined material-hopper of the straw-fan, the chaff-discharge being shown in section. Fig. 3 is a sectional end elevation as viewed from the rear of the machine through the broken vertical line A A of Fig. 1 of the drawings. Fig. 4 is an end elevation through the broken vertical line B B of Fig. 1 of the drawings, showing particularly the chaff-fan and casing, together with the inclined chaff-hopper, as viewed from the rear end of the machine. Fig. 5 is a plan of the straw and chaff fan casings, their respective inclined hoppers, and especially the opening to admit chaff in the straw-fan hopper, which communicates with the chaff-fan pipe by means of the branch of the chaff-fan pipe. Fig. 6 is a detail part sectional plan of the chaff-fan casing with pipe and branch pipe, showing particularly the hinged chaff-cut-off door of said pipe and branch pipe positioned to open the communication of the chaff-pipe with its branch pipe. Fig. 7 is a detail part sectional plan similar to Fig. 6 of the drawings, showing the communication of the chaff-fan pipe closed from its branch pipe, also the chaff-opening in the straw-fan inclined hopper closed by the slidable door of said hopper.

Similar characters refer to similar parts throughout the several views.

In the drawings the framework of the threshing-machine is indicated by C, which is supported by the ground-wheels D.

It will be obvious that in this invention the straw-fan casing or housing 2, with its revolving fan 3, and the chaff-fan casing 4, with its revolving fan 5, are located at opposite sides of the thresing-machine and within the framework C of the machine.

The location of the fans referred to is designed to afford sufficient incline and capacity to the inclined straw-fan hopper 6, which communicates with the straw-fan casing, and also to the inclined chaff-fan hopper 7, which communicates with the chaff-fan casing 4. The feature of location of the fan-casings referred to is important in order to afford free and easy access of the material—that is, the straw and the chaff—to their respective fans, and especially in relation to the chaff-fan hopper. It is necessary that the said hoppers should have sufficient fall or incline to accomplish their object of feeding the fans with the material and without the material having a retarding tendency or stop in its progress down the incline of the hopper. The sides of the straw-fan casing 2 are parallel above the horizontal line through the center thereof, and the lower part of said casing gradually widens inwardly toward the material-hopper 6, then extends to the width of the straw-discharge pipe 8. This feature allows the straw to have free access to the straw-fan casing and also free outlet to the discharge-pipe 8. The inclined hopper 6 extends from the straw-fan casing 2 to the opposite side of the machine and the upper end of the hopper is attached to the framework of the machine and comprises a horizontally-slidable door 9, which is shown in Fig. 1 of the drawings partially open. The door 9 is to allow admittance to the straw-hopper 6, to the fan and fan-casing 2, and to other parts of the machine for various purposes.

The inclined chaff-hopper 7 extends from the lower part of the fan-casing 4 to the opposite side of the machine. The hoppers 6 and 7, together with their respective fan-casings, are inclosed within the framework of the machine.

The straw-fan 3 is secured on its shaft 12, which revolves in the bracket-bearing 13, secured to the machine. The shaft 12 is provided with a drive-pulley 14 to transmit power to and revolve the fan 3.

The chaff-fan 5 is secured on its shaft 15, which revolves in the bracket-bearing 16, secured to the machine. The shaft 15 is provided with a drive-pulley 17 to transmit power to and revolve the fan 5.

The fans 3 and 5 coöperate with each other and at the same time to force pneumatically the straw and the chaff through their respective discharge-pipes or through the straw-discharge pipe only, as is desired. The upper part of the chaff-fan casing 4 has a stationary inclined cover 18 in order that the chaff may be guided to its hopper and be prevented from lodgment on the casing proper. The cover 18 is shown very fully in Fig. 4 of the drawings. The removable diaphragm or divisioning-board 19 extends transversely from the casing 2 to the opposite side of the machine and divides the straw-fan hopper from the chaff-fan hopper and acting as a wall for both said hoppers. The inclined door 20 immediately over the straw-fan casing is capable of sliding horizontally and inclines the straw toward the straw-hopper 6. With the inclined part 20 above the straw-casing 2 it is impossible that the straw will find a lodgment on the straw-fan casing. When the slidable door 20 is open, the operator on that side of the machine is allowed to assist in adjusting the various kinds of grain-sieves of the machine or other necessary purposes.

The chaff-discharge pipe 22 has open communication with the lower part of the chaff-fan casing 4 and at the rear thereof. The rear end of the pipe 22 may be continued or connected to a suitable pipe to carry the chaff to any desired and independent place.

A branch chaff-discharge pipe 23 communicates with the chaff-discharge pipe 22 and with the inclined floor of the straw-fan hopper 6, as at 24 in Fig. 5 of the drawings. At the juncture of the branch pipe 23 with the pipe 22 is a chaff-cut-off door 25, hinged at 26 of said juncture. The door 25 in Fig. 6 of the drawings is shown in position to allow communication with the branch pipe 23, and in Fig. 7 of the drawings the door 25 is shown in position to cut off the communication of the branch pipe 23 with the pipe 22. A quadrant 27 at the junction of the pipes 22 and 23 is arranged to hold the resilient protruding handle of the door 25 in either position shown, said handle being resilient, so that it will latch with the quadrant 27.

28 is an inclined slidable door with manipulating rod or lifter 29 connected to the upper part thereof. This door 28 is capable of covering the opening 24 in the floor of the inclined straw-hopper 6 and also of closing said opening 24. The door 28 is shown in closed position, as is the door 25, thereby preventing the chaff from the fan 5 from entering the branch pipe 23 and the hopper 6, as shown in Fig. 7 of the drawings. The hinged cut-off door 25 may be adjusted to and retained in either position, as shown, by any convenient method.

The operation of the invention is as follows: The fans referred to are revolved in the same direction as indicated by arrow and cause a suction to the straw and to the chaff, which falls from the thresher into their respective hoppers 6 and 7. The straw and the chaff enter their respective fan-casings 2 and 4 and are then blown each through its respective discharge-pipe 8 and 22, the doors 25 and 28 being closed, as shown in Fig. 7 of the drawings. In order to divert the chaff from the chaff-fan 5 to the straw-fan 3, the door 25 of the juncture of the pipe 22 with the branch pipe 23 is opened, as shown in Fig. 6 of the drawings, to allow the chaff to proceed through the branch pipe 23 and through the opening 24 in the inclined straw-fan hopper 6. At this time the inclined slidable door 28 is opened, thereby leaving the opening 24 open to the chaff. The straw-fan 3 in its revolutions has considerable suction power on the hopper 6 and draws the chaff from the chaff-fan, together with the straw in said hopper 6, into the straw-fan casing 2. The straw and the chaff are then pneumatically forced together through the discharge-pipe 8 by means of the straw-fan 3 to desired place.

The relative position of the straw-fan and the chaff-fan to each other, the chaff-fan being a distance forward of the straw-fan and in positions in the machine previously referred to, facilitates the reception of the straw and the chaff to their respective fans, and also the discharge of the straw and the chaff through their respective discharge-pipes, and also very particularly facilitates the discharge of the chaff together and intermixed with the straw through the discharge-pipe 8.

Various changes in the form, proportion, and minor details of our invention may be resorted to without departing from the spirit and scope thereof.

What we claim as as our invention, and desire to secure by Letters Patent, is—

1. In a pneumatic straw-stacker for threshing-machines, a straw-fan casing within the sides of the machine, a chaff-fan casing on the opposite side of the machine and within the frame thereof, suitably-mounted fans to revolve in said casings inclined material-hoppers communicating with said casings and extending to the opposite sides of the machine, and material-discharge pipes communicating with said casings, substantially as set forth.

2. In a pneumatic straw-stacker for threshing-machines, an inclined straw-fan hopper, a chaff-fan casing, a chaff-discharge pipe communicating with said casing, a branch pipe communicating with said discharge-pipe and with said hopper, and means for closing the discharge-pipe beyond the junction of said pipes, substantially as set forth.

3. In a pneumatic straw-stacker for threshing-machines, an inclined straw-fan hopper, a chaff-fan casing, a chaff-discharge pipe communicating with said casing, a branch pipe communicating with said discharge-pipe and with said hopper, means for closing the communication of the branch pipe with the hopper and means for closing the communication of the discharge-pipe with the branch pipe, substantially as set forth.

4. In a pneumatic straw-stacker for threshing-machines, a straw-fan casing inclosed within the framework of the machine an inclined door capable of sliding horizontally on said casing, an inclined material-hopper communicating with said casing and extending to the opposite side of the machine, a material-opening in the incline floor of said hopper, and means for closing said material-opening, substantially as set forth.

5. In a pneumatic straw-stacker for threshing-machines, a straw-fan casing inclosed within the sides of the machine, an inclined material-hopper communicating with the casing and extending to the opposite side of the machine, a material-opening in the inclined floor of the hopper, means for closing said opening, and a horizontally-slidable door immediately above the higher extended end of the hopper, substantially as set forth.

6. In a pneumatic straw-stacker for threshing-machines, a straw-fan casing, an inclined material-hopper communicating with the casing and extending to the opposite side thereof, a discharge-pipe connected to the casing, a material-opening in the inclined floor of the hopper, a chaff-fan casing within the sides of the machine and on the opposite side to the straw-fan casing, an inclined chaff-hopper communicating with the chaff-fan casing and extending to the opposite side thereof, a removable diaphragm between said hoppers, a chaff-discharge pipe communicating with the chaff-fan casing, a branch pipe communicating with the chaff-discharge pipe and with said opening in the hopper and means for closing the chaff-discharge pipe immediately beyond the junction of the chaff-discharge pipe and said branch pipe, substantially as set forth.

7. In a pneumatic straw-stacker for threshing-machines, a straw-fan casing and contained straw-fan located at one side of the machine, and chaff-fan casing and contained chaff-fan located at the opposite side of the machine, material-hoppers for the respective casings which extend in opposite directions toward opposite sides of the machine, and material-discharge pipes communicating with the respective fan-casings.

8. In a pneumatic straw-stacker for threshing-machines, a straw-fan casing and contained straw-fan located at one side of the machine, and chaff-fan casing and contained chaff-fan located at the opposite side of the machine, material-hoppers for the respective casings which extend in opposite directions toward opposite sides of the machine, and material-discharge pipes communicating with the respective fan-casings, and a branch pipe having a regulator-valve, said branch pipe leading from the chaff-fan casing to the straw-fan casing.

9. In a pneumatic straw-stacker, the combination with a straw-forcing-fan casing, a fan in said casing, and a hopper for directing the straw to the said casing, of an outlet for the straw from said casing, a conduit opening through a wall of the hopper, a regulator-valve controlling said conduit, and a chaff-forcing fan for sending the chaff through said conduit into the hopper.

10. In a pneumatic straw-stacker for threshing-machines, the combination with the machine-framework, of a straw-fan casing and contained straw-fan located at one side of the machine-framework, and chaff-fan casing and contained chaff-fan located at the other side of the machine-framework, material-hoppers for the respective casings, material-discharge pipes for the respective fan-casings, and movable gates or doors at the sides of the framework.

In testimony whereof we affix our signatures in presence of two witnesses.

ROBERT CHRISTIE.
THOMAS BARCROFT CHRISTIE.

Witnesses:
JOHN H. HENDRY,
M. ROUSSEAUX.